US012792562B2

(12) United States Patent
Rath et al.

(10) Patent No.: US 12,792,562 B2
(45) Date of Patent: Nov. 10, 2026

(54) GENERATING FAST AND GUARANTEED REPORTS FOR RETENTION LOCKED FILES IN A BACKUP SYSTEM

(71) Applicant: Dell Products L.P., Round Rock, TX (US)

(72) Inventors: Jagannathdas Rath, Bangalore (IN); Sraisailendra Yallapragada, Cupertino, CA (US); Nitin Madan, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 18/364,379

(22) Filed: Aug. 2, 2023

(65) Prior Publication Data

US 2025/0045243 A1 Feb. 6, 2025

(51) Int. Cl.

| | |
|---|---|
| ***G06F 16/11*** | (2019.01) |
| ***G06F 11/1446*** | (2026.01) |
| ***G06F 16/16*** | (2019.01) |
| ***G06F 16/176*** | (2019.01) |

(52) U.S. Cl.

CPC ........ *G06F 16/125* (2019.01); *G06F 11/1464* (2013.01); *G06F 16/166* (2019.01); *G06F 16/1774* (2019.01); *G06F 2201/84* (2013.01)

(58) Field of Classification Search

CPC ............... G06F 16/1844; G06F 16/178; G06F 11/1469; G06F 11/1446; G06F 11/1466; G06F 16/125; G06F 16/122; G06F 11/1458

USPC ....... 707/603, 640, 645–648, 653, 654, 682, 707/662, 694, E17.01

See application file for complete search history.

(56) References Cited

U.S. PATENT DOCUMENTS

| | | | | |
|---|---|---|---|---|
| 7,100,195 | B1 * | 8/2006 | Underwood | H04L 63/0823 707/999.009 |
| 9,578,063 | B1 * | 2/2017 | Iyer | G06F 9/45558 |
| 9,939,981 | B2 * | 4/2018 | Varadharajan | G06F 11/1446 |
| 10,346,237 | B1 * | 7/2019 | Surendra Rao | G06F 11/079 |
| 10,437,937 | B2 * | 10/2019 | Kilaru | G06F 11/1466 |
| 10,853,146 | B1 * | 12/2020 | Talayco | H04L 67/1097 |
| 11,080,336 | B2 * | 8/2021 | Van Dusen | G06Q 10/10 |
| 11,102,251 | B1 * | 8/2021 | Pettit | H04L 41/0813 |
| 11,601,425 | B1 * | 3/2023 | Ponnuswamy | H04L 63/083 |
| 11,615,185 | B2 * | 3/2023 | Lee | G06F 21/6218 726/23 |

(Continued)

*Primary Examiner* — Tony Mahmoudi
*Assistant Examiner* — Linh Black
(74) *Attorney, Agent, or Firm* — Staniford Tomita LLP

(57) ABSTRACT

A retention lock report generation process that creates, upon deployment of a backup server in the backup system, a hidden directory structure in local storage of the backup server. Upon retention locking of a file, the process writes details of the file and lock operation to a retention lock audit (RLA) log in the form of a timestamped RLA log file. The RLA log is then stored in the hidden directory structure in the filesystem, and maintained as a rotating log containing only a latest timestamped RLA log file. Previous RLA log files are retention locked and stored differently from the RLA log. In response to a request, the RLA log and the retention lock settings for the locked files including the previous RLA log files are provided to the user, without requiring traversal of the entire filesystem as in present retention lock reporting methods.

17 Claims, 7 Drawing Sheets

(56) References Cited

U.S. PATENT DOCUMENTS

| | | | | |
|---|---|---|---|---|
| 11,954,067 | B2 * | 4/2024 | Gunda | G06F 11/1458 |
| 2015/0310025 | A1 * | 10/2015 | Rathgeber | G06F 16/125 707/662 |
| 2019/0138386 | A1 * | 5/2019 | Konduru | G06F 11/1435 |
| 2020/0042395 | A1 * | 2/2020 | Chu | G06F 16/24552 |
| 2020/0097195 | A1 * | 3/2020 | Fritz | G06F 3/0647 |
| 2022/0334929 | A1 * | 10/2022 | Potyraj | G06F 3/067 |
| 2023/0045034 | A1 * | 2/2023 | Shaik | G06F 16/1774 |
| 2023/0106269 | A1 * | 4/2023 | Mitkar | G06F 11/1451 707/654 |
| 2023/0342334 | A1 * | 10/2023 | Madan | G06F 16/1748 |
| 2024/0095101 | A1 * | 3/2024 | Patro | G06F 11/3006 |
| 2024/0273186 | A1 * | 8/2024 | George | G06F 21/6218 |
| 2024/0281338 | A1 * | 8/2024 | Regen | G06F 11/1464 |
| 2024/0320336 | A1 * | 9/2024 | Ezrielev | G06F 21/53 |
| 2025/0045244 | A1 * | 2/2025 | Rath | G06F 16/1774 |

* cited by examiner

GENERATING FAST AND GUARANTEED REPORTS FOR RETENTION LOCKED FILES IN A BACKUP SYSTEM

TECHNICAL FIELD

This invention relates generally to data protection systems, and more particularly to producing reports for retention locked files.

BACKGROUND OF THE INVENTION

Retention locking is often used to store data in an immutable, indelible form for a certain duration after its written. The lock duration can be from just a few weeks to few years. After the retention duration expires, the backup applications cleanup the backups and delete the expired files on the backup server.

Large-scale data processing systems in enterprise-level deployments face ever increasing amounts of data and scalability. As the number of backup jobs increase over time, the number of files locked in the backup server can also increase drastically, especially when retention duration is long (i.e., on the order of years or decades). The backup jobs can thus result in few millions to even billions of files in some cases, such as when a large number of small files are ingested on every backup job. Retention lock reports are used to list any locked files present at a point in time, and are produced through an iterative file system walk process, which can be very resource intensive. This large number of locked files brings on several challenges for backup servers, such as generation of complex and possibly incomplete retention lock reports, and the need to periodically dump lists of locked files, such as for data auditing. Current methods of retention lock reporting thus require excessive amount of time and resources for large-scale systems, such as those processing upwards of hundreds of millions of files.

What is needed, therefore, is an efficient method to provide much faster retention lock reporting for existing as well as previously existing files.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, Data Domain Boost, and Power Protect are trademarks of Dell Technologies, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
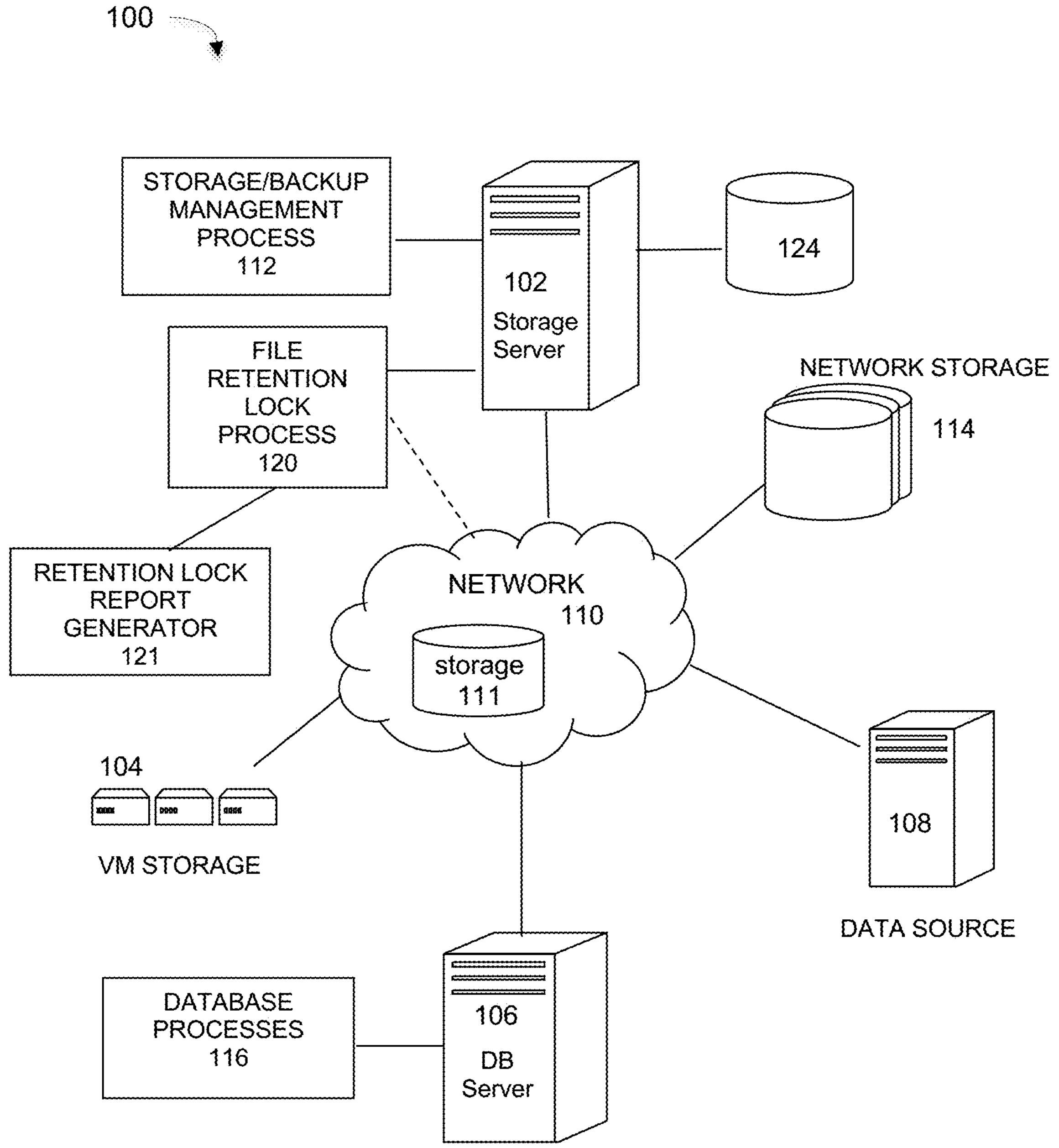
FIG. 1 is a diagram of a data storage network implementing improved retention lock reporting processes for stored data, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system and method to producing guaranteed reports for retention locked files. FIG. 1 illustrates a computer network system that implements one or more embodiments of a data storage network system implementing a retention lock protection, under some embodiments. In system 100, a storage server 102 executes a data storage or backup management process 112 that coordinates or manages the backup of data from one or more data sources 104, 106, or 108 to storage devices, such as local storage in 102 itself, network storage 114, or possible cloud storage 111 in network 110. The backup server 102 hosts the backup application to manage and trigger backup jobs. These backup jobs will backup data (VMs, databases, files, etc.) from the data sources (like VMs, Databases, files etc.) to the backup/storage server.

With regard to virtual storage 104, any number of virtual machines (VMs) or groups of VMs (e.g., organized into virtual centers) may be provided to serve as backup sources. The data sourced by the data source may be any appropriate data, such as database data that is part of a database management system, and the data may reside on one or more hard drives for the database(s) in a variety of formats. Thus, a data source may be a database server 106 executing one or more database processes 116, or it may be any other sources of data 108 for use by the resources of system 100.

The network server computers are coupled directly or indirectly to the network storage 114, VMs 104, and the data sources and other resources through network 110, which is typically a LAN, WAN or other appropriate network, like a cloud network. Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, network 110 may be a private network or it may be a public network provided by a third-party cloud service provider (CSP). In this case, at least part of the infrastructure of network 110, such as servers, routers, interfaces and so on are provided to users such as storage server 102 as an IaaS (Infrastructure as a Service), Saas (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. The cloud service provider server 108 may be maintained by any company such as Amazon, Dell, and so on. Depending on implementation, each cloud provider may show up as a cloud tier inside the file system for the user, such as the Power Protect Data Domain file system.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Power Protect Data Domain Restorer (DDR)-based deduplication storage system, and storage server 102 may be implemented as a DDR Deduplication Storage server provided by Dell. However, other similar backup and storage systems are also possible.

As shown in FIG. 1, system 100 includes file retention lock process 120 that locks selected files against modification or deletion to protect these files from unintended or unwanted changes, or malicious tampering. Retention locking is typically enabled by user selection at time of file creation or modification to lock the file for an open-ended or specified period of time, which may be extended or reverted by the user, as per allowed policies. Retention locking may also be implemented executed by the storage server 102 as part of backup management process 112, or it may be executed by a cloud or network 110 resource, such as if a set of files is governed by a policy that automatically locks the files. In some embodiments, lock process 120 can also be part of the storage server 102 filesystem itself.

A list of all currently locked files is usually made available by the lock process 120 upon a command to generate a retention lock report. As shown in FIG. 1, system 100 also includes a retention lock report generator 121 that efficiently generates retention lock reports for process 120 in a manner that does not involve the excessive time and resource requirements of present lock reporting methods.

The data sourced in system 100 may be unstructured data, such as application files (documents), e-mails, and so on. After long periods of time, such data is typically not accessed often, yet must be retained due to certain required retention policies. As such data can often include sensitive business or personal information, it must also be protected against unwanted access and disclosure, as well as protected against deletion or modification.

In general, the file retention lock process includes software that allows a user to set the lock on a file to prevent deletion or modification of a file for a set number of years, such as up to 70 years. The lock is set until the expiration period (expiry) during which, no one is able to modify or delete the file, but after the expiration period has lapsed, the file can be deleted.

Figure 2:
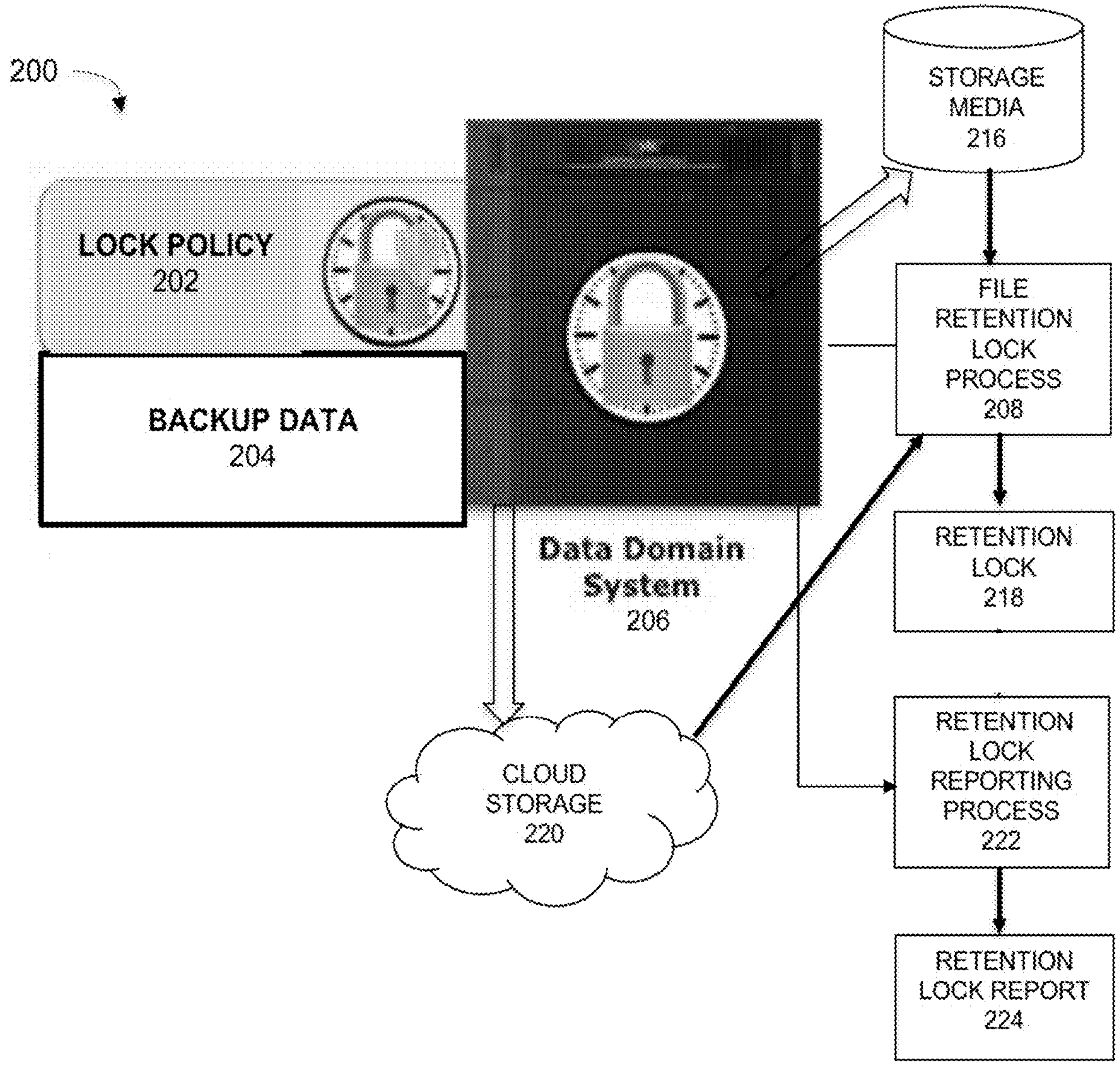
FIG. 2 illustrates the incorporation of the compliance and governance standards in a deduplication backup system, under some embodiments.

Files may be retention locked for a variety of reasons, and one main reason is to comply with certain backup policies. FIG. 2 illustrates the incorporation of lock policies for storing data in a backup system, under some embodiments. For the embodiment of system 200, a retention lock process 208 is used that can support lock policies 202 applied to backup data 204, such as to comply with backup rules or certain corporate/government compliance retention rules in a backup system 206, such as a Power Protect Data Domain backup system.

Various types of data may be backed up, and the lock policies 202 may vary accordingly. For example, corporate standards for secure data retention are generally considered to be more lenient than government/regulatory standards. They allow for flexible control of retention policies but not at the expense of maintaining the integrity of the data during the retention period. These standards apply to environments where the system administrator is trusted with his administrative actions. Depending on the policies, the storage system 206 should securely retain backup data as per requirements such as: (1) allow backup files to be committed for a specific period of time during which the contents of the secured file cannot be deleted or modified; (2) allow for deletion of the retained data once the retention period expires; (3) allow for ease of integration with existing backup application infrastructure through industry standard protocols such as CIFS, NFS or any proprietary protocol like Power Protect DDBoost; (3) provide flexible policies such as allow extending the retention period of a secured file, revert of locked state of the backup file, etc.; and (4) provide the ability to replicate both the retained backup files and retention period attribute to a destination site to meet the DR needs for backup data. Other requirements may also be possible.

The storage server 102 of FIG. 1 may be part of a deduplication backup system, such as a Power Protect Data Domain system. FIG. 2 illustrates a Data Domain system using a retention locking process, under some embodiments. As shown in FIG. 2, Data Domain system 206 includes a backup server that receives data 204 from various sources for backup and possible long term storage (LTR) through a deduplication backup system. The server applies one or more policies 202 (e.g., conforming to application rules or governance/compliance rules) for storing the data. The deduplication backup system 206 deduplicates the data according to its processes and then sends this data to storage media 216, also referred to as a 'storage target', which may be local storage or network storage of any appropriate media (e.g., disk, tape, solid state memory, etc.). For full or partial cloud-based networks, the backup data can also, or instead be sent to cloud storage 220 after local storage in the backup system 206.

After the data is received in the backup system 206, once ingest is complete, then the backup applications issue lock requests through process 208 to set the lock 218 for the newly written files. Files are thus generally locked after they are written to the storage media 216, or cloud storage 220. The retention lock 218 can be applied to any appropriate data object or element (e.g., directory, file, filesystem, etc.) as it is written and stored in the storage media. The retention lock process is typically initiated directly by the application or user to lock the data object, but it may also be invoked by a server or filesystem process.

For an embodiment in which the deduplication system is a Data Domain system, a Power Protect Data Domain Managed Tree (MTree) is used to facilitate the consolidation and protection of both governance and compliance backup data in a single storage system. MTree(s) are user-defined logical partitions of the Data Domain file system that enable granular management of data in Data Domain system. In an embodiment, retention lock software 208 can be enabled at an individual MTree level. In general, once a backup file has been migrated onto a Data Domain system, it is the responsibility of the backup application to set and communicate the retention period attribute to the Data Domain system.

It should be noted that the data backup system of FIG. 2 is provided for purposes of illustration, and retention lock process 208 can be used with any appropriate deduplicated backup system (other than Data Domain), and other or alternative retention policies, rules, and standards. Furthermore, although embodiments are described with relation to retention locking for regulatory compliance, embodiments are not so limited and files may be retention locked for a variety of other reasons as well.

In many situations, the status of locked files must be reported. A retention lock report comprises a list of locked files at a particular point in time. Generating a retention lock report involves walking the file system and cataloging all of the locked files for display in a list. As stated in the Background section, current systems feature several shortcomings when generating and processing retention lock reports. For example, iterating a filesystem with hundreds of millions of files takes great amount of time as well as system resources (CPU, RAM etc.). With current scales of data, most systems today cannot dump a retention lock report every few days or every week or 2 weeks when there are hundreds of millions of files and that are constantly growing, at this rate, it could take days for even one report to be generated. In current systems, a retention lock report generated at any point of time will only list the files that are present at that point of time. It will not prove if a currently non-existent file was ever locked and then deleted after lock expiry, or if a file was never locked. Scanning for this information in the logs is also not practical as logs tend to rotate and most times, they will not even be available at the later point of time.

As shown in FIG. 2, embodiments of system 200 include a retention lock reporting process and 222 that provides a much faster way to generate retention lock reports 224 for new and previously existing files and datasets for all of the different backup jobs generated by different backup clients (e.g., 106 and 108). Such a retention lock report is typically initiated by a user request when they desire to see a list of locked files. Alternatively, such a list can be generated periodically by an auditing policy, or other similar process. As shown in FIG. 2, the lock reporting process 222 is independent of the retention lock process 208. In an alternative embodiment, however, they may be combined to some degree.

In present systems, retention lock reports are typically generated on a temporary basis as they are meant to be viewed by a user. No specific mechanisms are usually provided for their storage, and they are typically written over or discarded after they are generated. Such reports are thus usually stored by default locally on the user's computer or in public storage, such as the cloud 220.

Retention Locking with Daily Lock Reports Stored Locally

In an embodiment, the retention lock report generator 121 creates a local retention lock audit log (hereinafter called "RLA log") that contains a list of retention locked files and their respective details including the time of retention locking (e.g., specific time/day). It stores this RLA log in a hidden storage area (e.g., a hidden MTree/filesystem unit/volume etc.) created in the backup server when the system is initialized for first time. This hidden MTree will not be visible in any MTree listings or other user exposed commands. The hidden MTree is configured to not be written to from outside the backup filesystem as well, though reads are allowed.

Figure 3:
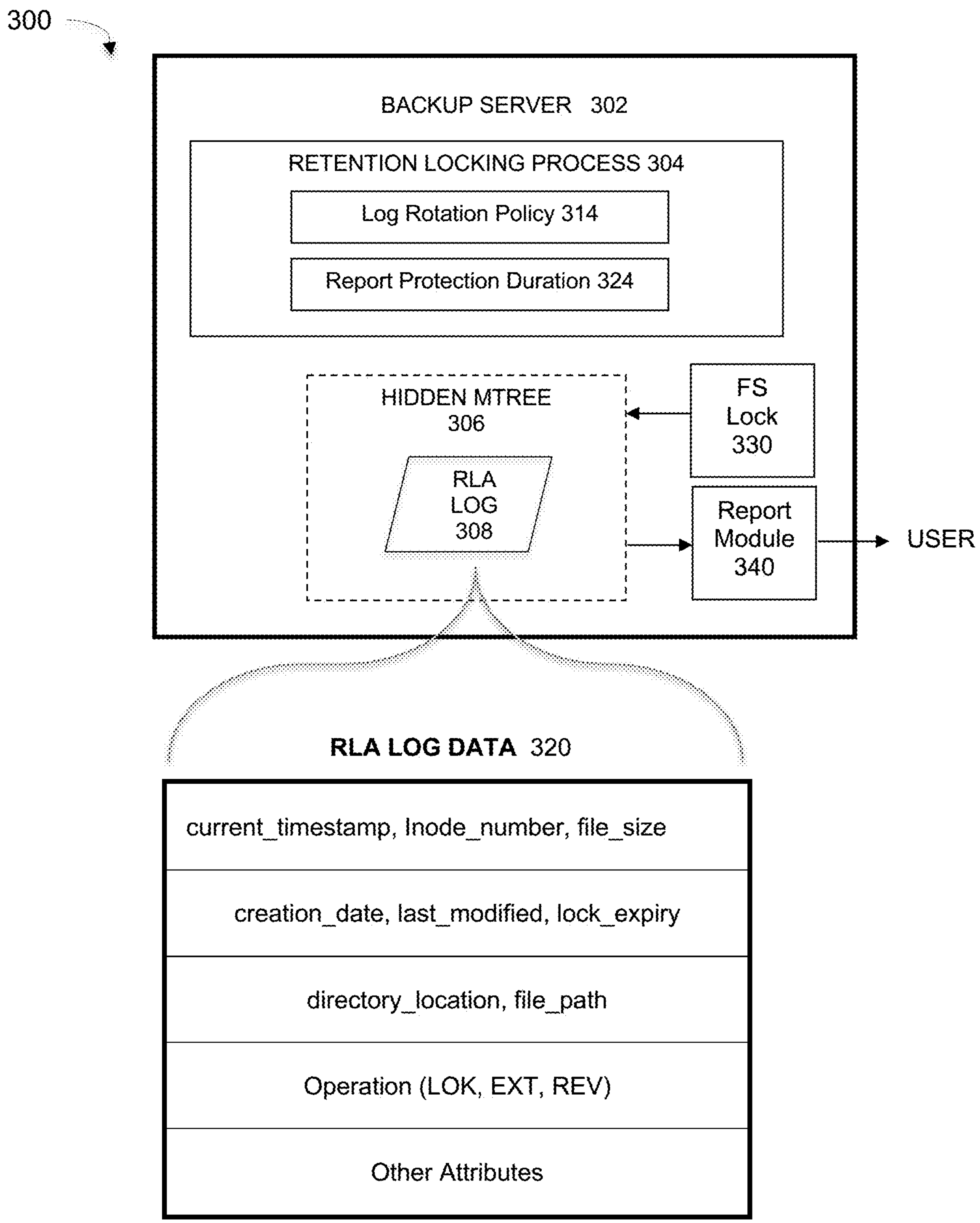
FIG. 3 illustrates a backup server implementing a retention lock audit log (RLA log) stored in a hidden MTree, under some embodiments.

FIG. 3 illustrates a backup server implementing a retention lock audit log stored in a hidden MTree, under some embodiments. System 300 of FIG. 3 includes a data backup server 302 that has a retention locking process 304 to lock files selected by the user or a system process. The backup server has or creates a local resident hidden storage location storing a hidden MTree 306, or other similar volume or filesystem unit. The hidden MTree is used to store a rotating RLA file 308.

The hidden MTree 306 and RLA log 308 are created upon deployment or first use of the backup server 302 and serve as perpetual storage of retention lock information for the system. The RLA log 308 is a rotating file in that a new RLA log file is created every day (e.g., at midnight), or other appropriate time period. Each RLA log is timestamped with its creation time, and thus these files will be created daily. The new file is stored in the same dedicated location within the hidden MTree, and the previous file is saved under its respective timestamp for later access, if needed. As shown in FIG. 3, the RLA log is stored in the backup server's filesystem. This way, the system can gain the benefits of log replay and other features in the event of a system crash, thus reducing the chances of losing the log content.

When the backup server 302 receives a file lock request and locks the file through process 304, it logs the relevant details in the RLA log 308. Any appropriate format and data element may be used to embody the RLA log. For example, it may comprise a single comma separated list, or a table with different fields, or any other appropriate data element.

In an embodiment, the RLA log 308 stores certain relevant information regarding the file or files that are retention locked. The example fields 320 show some data elements stored in the RLA log 308. These items include:

i. Current timestamp with time zone, Inode number, File size
ii. Creation date, Last modified data, Retention lock expiry date
iii. File path
iv. Operation, e.g., LOK, EXT, REV, where LOK indicates that the file is locked, EXT indicates that a lock has been extended, and REV indicates that a lock has been reverted or terminated.

This is only one example of RLA log contents, and any other or additional items can also be used depending on system configuration and applications. Likewise, as stated above, the RLA log format can be provided as a list, table, or any other appropriate format.

As mentioned above, the RLA log 308 is a rotating log file. For this embodiment, the backup server 302 configures a log-rotation policy 314 for the retention locking process 304. This policy will rotate the log file every day at a certain time (e.g., 00:00 midnight), which can be performed by a cron job or an independent process or thread in the backup server or its filesystem, or any other appropriate log rotating software.

The rotating log file mechanism creates previous copies on a regular basis, such as daily, when a new RLA log is stored in the hidden MTree. These files will be persisted in the backup server as flat files, databases or other formats, as convenient to the backup server. Just after the rotation, the backup server renames the earlier rotated log file (e.g., containing yesterday's entries) appropriately as "rl_report_date_times_timezone.log". For example, "rl_report_20230120_001500_PST.log," or any similar unique timestamped file. These files are then retention locked for a certain duration to protect them from unwanted modifications and deletions. In general, all of these files are kept in the same MTree, but can be put under different directories. For example, the filepath "2023/January/*" would contain all logs in the month of January 2023, and "2023/February/*" would contain all locked RLA files for February 2023, and so on. Alternatively, they can also be just stored locally along with the current RLA log file.

The file renaming process can be accomplished by any appropriate filesystem process. For example, it may involve the backup server to mount the MTree locally via any of the supported protocols (e.g., NFS, SMB, etc.) and then copy the file, retention lock it with lock 330 and unmount it. Eventually, the hidden MTree 306 will contain one retention-locked report file for each day containing the details 320 of files locked on that day. These locked RLA files can never be modified, renamed, overwritten or deleted before expiry of their lock duration.

In an embodiment, the current RLA log and past log files are hidden and are automatically retention locked using a filesystem lock, and not a user or application initiated lock. That is, a separate filesystem retention locking process 330 is used to lock the RLA log, 308.

In an embodiment, the retention locking process uses a "report protection duration" parameter 324 that can be set by users or administrators to specify the amount of time (e.g., number of days) that retention lock report data i.e., the locked RLA files will be protected locally on the server 302 (e.g., 6 months, 1 year, 5 years, etc.). This parameter is generally configured only once in the backup server and can never be reduced thereafter, but the protection duration can be increased as needed. This parameter must be configured prior to use of the filesystem, such as upon deployment of the backup server 302.

This mechanism provides a significant degree of disaster or crash recovery capability. For example, if the server crashes before locking a file, once it comes up again, the lock process 304 can check the lock state of last few files and if any of them are still not locked, it can then lock them straightaway and update entries in the RLA log file.

System 300 of FIG. 3 provides a much faster method of providing retention lock reports. It eliminates the present need to walk the entire filesystem and identify files that are tagged or encoded as "locked" when a lock report is requested. To generate a report, the reporting module 340 only needs to read the required RLA log files from the hidden MTree 306 and display it to the user. The report display can be configured by the user, as desired. For example, it can be configured to display the report for last 30 days by default, but will provide options and filters with which users can specify other date ranges if necessary. Other graphical user interface (GUI) features can be used, such as specifying file name or patterns to display the lines matching those filenames or patterns only. If it happens that the log file gets rotated while the last write is still executing, and the last line gets split across two files, the reporting module 304 fixes this by checking if the line is incomplete and then reading the remaining part from the previous file, or vice-versa.

The system poses virtually no disadvantage except for storing the daily log files out of the rotating RLA logs. Storing these reports would use some of the storage capacity of the backup server. For example, if one entry for one file (i.e., one line requires 128 bytes), then 1 Billion entries would consume only around 120 GB of storage space. However, this value is typically negligible considering the amount of space the 1 Billion files themselves take up in the backup server. Also, if the backup server supports deduplication and compression internally (e.g., PowerProtect Data Domain), then the space utilization for these files would be drastically less.

As shown above, the common operations for the locking process 304 are LOK to lock a file, EXT to extend an existing lock, and REV to revert (terminate) a lock. With respect to lock extensions, often the locks on the files get extended at a later date. In this scenario, the reports will contain multiple entries for one file. For lock extension operations, the last "operation" column would contain the word "EXT" to signify that the lock has been extended). This is fine as long as the entries exist and indicate clearly that lock extension happened on a particular date. The latest entry will be dominant in this case.

With respect to lock reverts, for non-compliance variants of retention lock (e.g., retention lock governance mode), the locks can be reverted from the files before the expiry dates. In such revert operations, the log will contain the word "REV" (to signify reverted), so the reports can clearly list all the reverted files just by filtering them out. Again the latest entry will be dominant here as well.

Figure 4A:
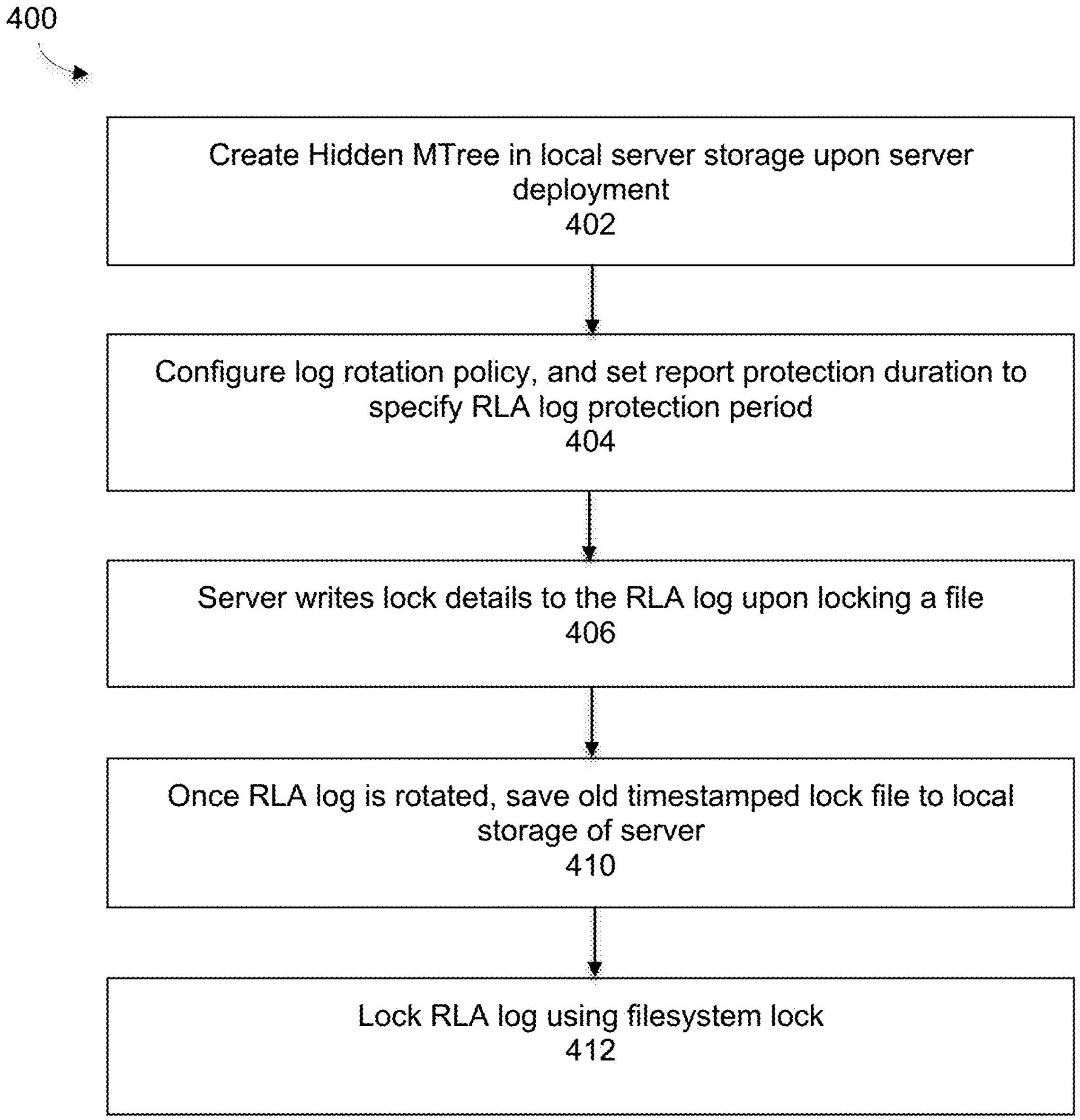
FIG. 4A is a flowchart that illustrates a method to generate and use a RLA log, under some embodiments.

FIG. 4A is a flowchart that illustrates a method to generate and use a RLA log for retention logging in a backup system, under some embodiments. Process 400 begins with the backup server creating a hidden storage area (e.g., MTree) in its local storage for storing a rotating RLA log file, 402. Step 404 sets certain operating parameters, such as it configures the log rotation policy that dictates the period of saving retention operation entities to the RLA log, and it sets the report protection duration that specifies the RLA log protection period, which dictates how long the RLA log is protected locally on the server.

Upon retention locking a file, the server writes the lock details to the RLA log, 406. As and when the backup application sends lock requests and a file get locked, one entry is added to the current RLA log file. At a certain time (e.g., each midnight), this RLA log file rotates and a new empty RLA log file comes in its place and subsequent lock settings write their entries to that henceforth. For example, all of the locks set in one day get written to the RLA log, which gets rotated at midnight every day, or all of the locks set in one week get written to the RLA log, which rotates on midnight of every Sunday, and so on. Based on the defined rotation period, the lock operation entries keep on getting written to the rotating RLA log file 406. Once a current instantiation of the RLA log file gets rotated, it is renamed as per the timestamp 410 and retention locked 412 for the configured protection duration (from step 404) in the same hidden MTree. In general, the term 'lock setting' refers to a lock state of "locked" or "not_locked" with respect to a file, and may also be referred to as a lock operation.

The RLA log and past log files can themselves be locked using a filesystem lock (330) by the server that is independent from the user-initiated lock process (304), step 412. Upon request by a user, administrator, or system process, the RLA log or any past reports can then be made available through the reporting module 340.

In an embodiment, process 400 can be enhanced to a two-step process. For this embodiment, when the lock operation begins, the lock process, in a first step, adds a log entry that a lock operation (e.g., LOK, EXT, or REV) is going to be executed on the file. Then, when the lock operation is completed, a second step of the process adds a log entry citing that lock operation on the file has been done successfully.

For this embodiment, if a crash happens before the step B adding of a log entry of success, the system can check the entries with only step A log entries and then validate the lock state on the corresponding file to see if it was locked successfully or not. If the crash happened after the file was locked, then the method adds the log entry to the file to mark it complete. If the crash happened before the lock operation completed, then the method has the option to trigger the lock operation on the file one more time.

Figure 4B:
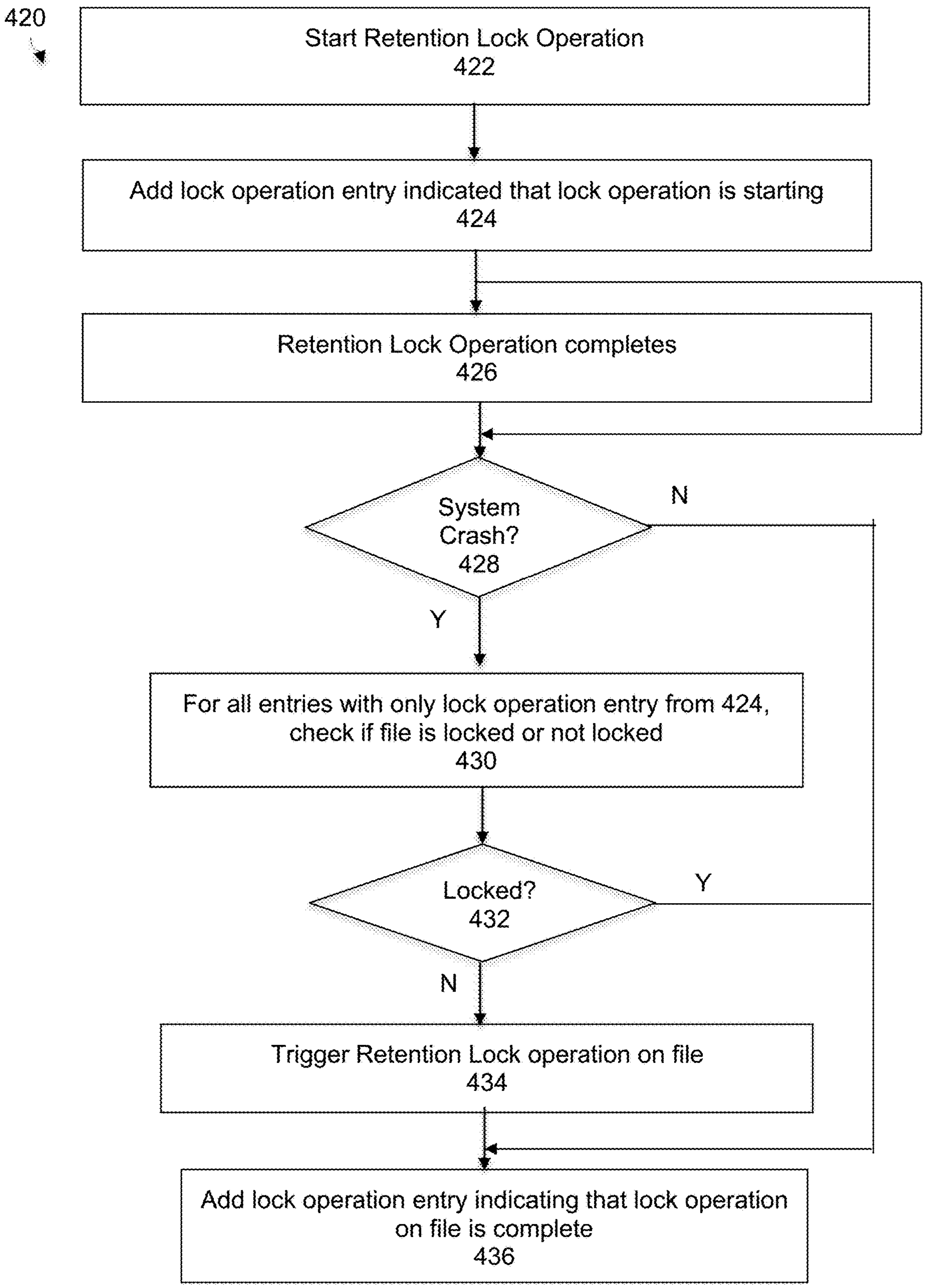
FIG. 4B illustrates a retention lock process adding log entries for lock commence and completion, under some embodiments.

FIG. 4B illustrates a retention lock process adding log entries for lock commence and completion, under some embodiments. Process 420 of FIG. 4B starts with the start of a lock operation, 422. A lock operation entry is added to the log indicating that the lock operation is starting, 424, and under normal circumstances, the retention lock operation completes, 426. If, however, a system crash occurs either before or after lock completion, 426, as determined in decision block 428, the process next checks if the file is locked or not locked for all entries indicating that a lock operation has started (from 424). If such a file is locked, as determined in decision block 432, the process adds a lock operation to the log indicating that the lock operation is on the file is complete, 436. If, however, the file is not locked, as determined in 432, the process triggers a retention lock operation on the file, 434. The lock operation entry indicating that the lock operation is complete is then added to the log, 436.

In an embodiment, the backup server 302 may also contain a transactional database, such as PostgreSQL or MySQL. For this embodiment, the retention locking process and RLA log processing may be used to log the lock operation data 320 into the transactional database instead of a flat file or other media. The records of this database can then be retrieved on a daily basis and dumped to a flat file or similar medium and retention locked in the hidden MTree. For example, a day's worth of SQL data may be dumped into a file that is then retention locked through 304. In this way, any database backup process can be utilized to backup on a daily basis and have the backups retention locked.

Embodiments above were described with respect to the lock reports saved locally on the backup server 302. In an embodiment, the lock reports comprising the RLA log 308 and the past (daily or weekly, etc.) RLA log files may also or instead be stored remotely, such as in cloud storage, such as provided by network 110 in system 100.

Figure 5:
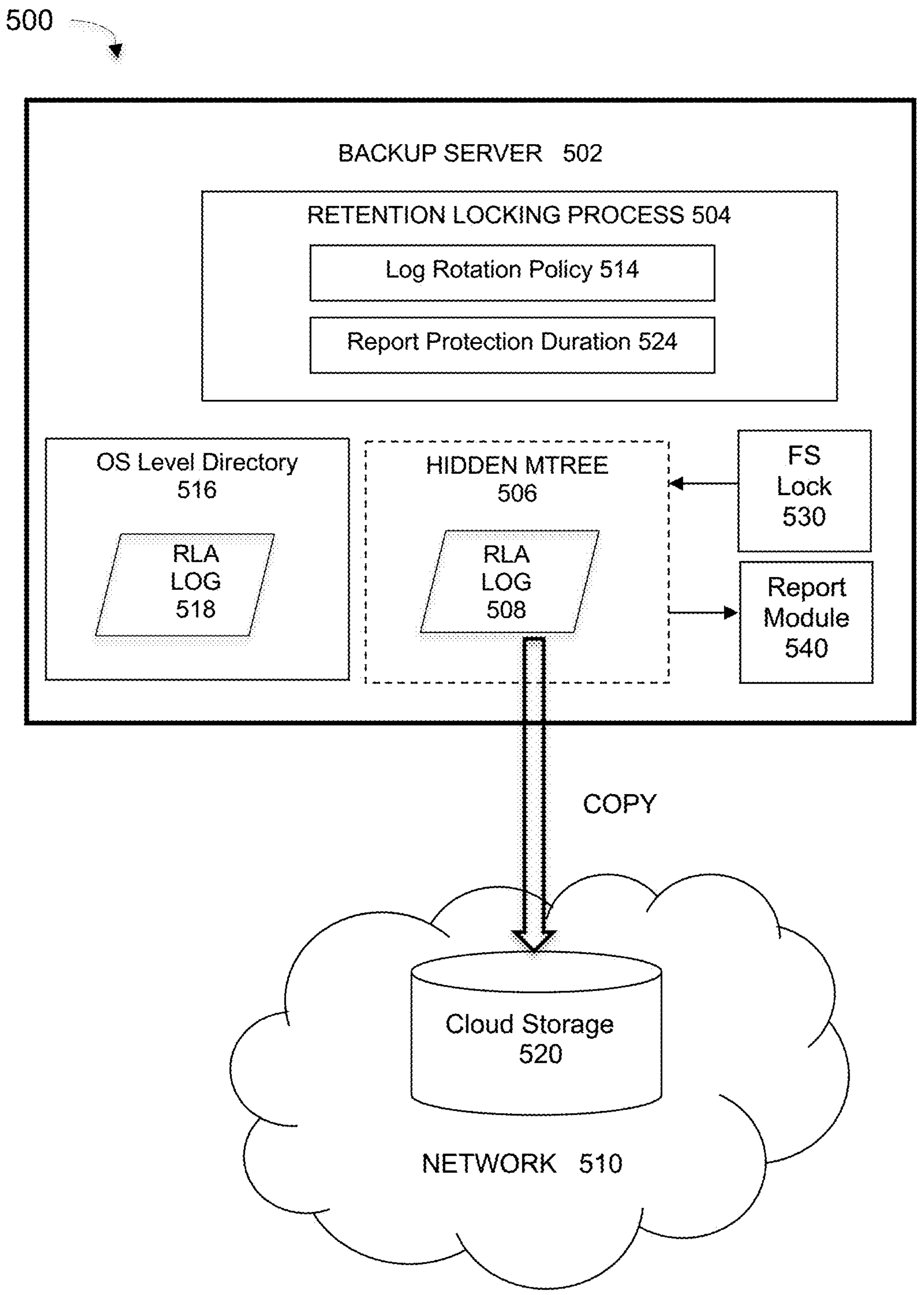
FIG. 5 illustrates a backup server implementing an RLA log stored in a hidden MTree and copied to cloud storage, under some embodiments.

FIG. 5 illustrates a backup server implementing an RLA log stored in a hidden MTree and copied to cloud storage, under some embodiments. For this embodiment, system 500 includes backup server 502 runs a retention locking process 504 that has a log rotation policy 514, and report protection duration 524 that operate as described above with respect to system 300 of FIG. 3 through their counterpart components 302, 314, and 324.

In an embodiment, the backup server stores a RLA log 518 to contain the list and details of files getting retention locked in the filesystem for a particular day. This log file 518 can be stored in the hidden MTree 506 or even in one of the underlying OS level directories 516, such as a directory backed by solid state devices (SSDs) or similar storage devices. If stored in the OS level directory, then access to this directory 516 can be strictly restricted with multiple gates, such as password control, unique time bound tokens, and so on to ensure security of the RLA log 518.

As shown in FIG. 5, an RLA log 508 can also be stored in a hidden MTree 506 (as described above for system 300) and then copied to cloud storage 520 in network 510. This cloud storage account will be configured in the backup server. (e.g., AWS S3, Azure object storage etc.), and an S3/object storage bucket/container will then be created in the cloud storage 520. This will then enable cloud native object locking in compliance or equivalent modes on the bucket/container. The backup server 502 may be configured to support data movement to a cloud for long term retention, but this S3 bucket/container is unrelated as the RLA log copy is not used for long-term retention of application data.

For the cloud-stored RLA log 508, the uploaded file should be named with the associated timestamp, in a format such as: "rl_report_date_time_timezone.log" (e.g., rl_report_20230120_001500_PST.log). Once the file is written to the object storage 520 of the cloud 510, the process will then retention lock the file on the object storage according to the pre-configured "report-protection-duration" parameter using the cloud provider's object locking APIs. After the locking is successful, it would remove the rotated copy present locally. It can also choose to keep it separately as a local cache for further reads. If the server crashes before the locking, then the rotated copy would still be left out of the directory, and when the server comes back up, it will see the file and repeat this same step again.

The system is configured such that the locked files in the object storage 520 can never be modified, renamed, overwritten, or deleted before the lock expiry, even by the cloud account administrator or root user.

System 500 allows the RLA log process to get the benefits of log replay, and so on, in the case of a system crash to thereby minimize the chance of losing log content data. This is also provided by cloud storage, which is separately located and generally not affected by a local system disaster.

The backup server 502 can have a local cache to store the uploaded files or downloaded files and can always refer these local files whenever available for performance and cost saving reasons.

Whichever is used at a particular time, either log file 518 or 508 has the same composition and elements of RLA log 308 as shown and described in FIG. 3. Likewise, the other components of the filesystem lock 530 and reporting module 540 operate the same as described for system 300.

The reports may be provided through a computer or console graphical user interface (GUI) for display to a user in any appropriate graphical form, or they can be redirected to a report file, or any other reporting service.

The embodiment of FIG. 5 allows the RLA log data to be stored remotely from the server and utilize certain object locking features provided by the cloud provider of object storage 510, thus leveraging certain archiving and additional offsite locking services.

Embodiments of this retention locking method allows the retention locking history to be preserved for any amount of time in a protected manner. Retention lock reporting is also much faster, as the backup server filesystem need not traverse the whole filesystem, which might contain billions of files and take days to fully iterate. It further allows for easy checking of locking by providing guaranteed proof of whether a certain file or set of files was locked or not in the past. Through a separate filesystem lock, the preserved reports are also protected from corruption, attacks, and attempted modifications or deletions etc., for any duration required.

Although embodiments are illustrated and described with respect to a Power Protect Data Domain system, which is a purpose-built backup appliance providing streaming deduplication, it should be noted that embodiments are not so limited and any other deduplication backup system may be used. Similarly, the cloud network 110 may integrate with an Dell ECS (or similar) system embodied as a public cloud or hosted private cloud to provide a scalable storage architecture. The system 100 may thus be implemented as an ECS-based object storage platform designed around use cases of an ever expanding cloud enabled data center. Object containers that can be created as an endless pool and scaled out across an expandable pool of storage nodes, and data may be stored as objects and accessed through API calls across multiple protocols including S3, Swift, and NFS among others. Embodiments are not so limited however, and other similar cloud-based storage systems may be used.

Embodiments of the processes and techniques described above can be implemented on any appropriate backup system operating environment or file system, or network server system. Such embodiments may include other or alternative data structures or definitions as needed or appropriate.

Figure 6:
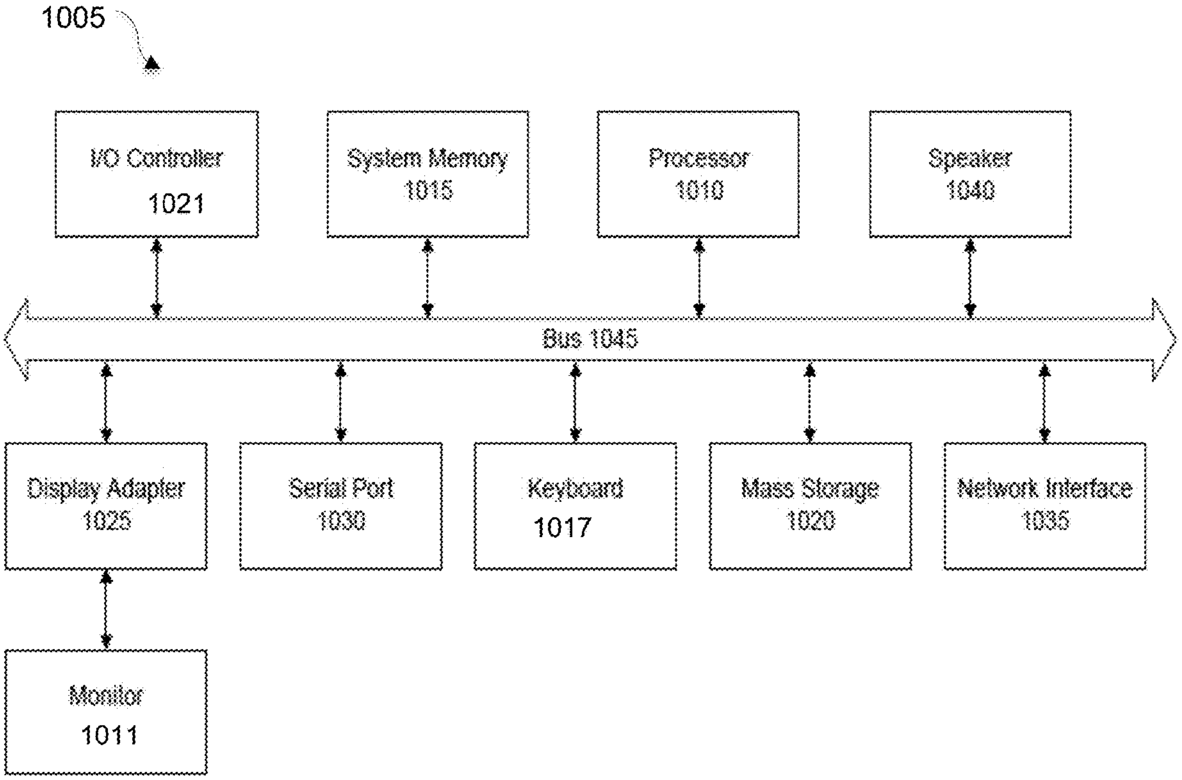
FIG. 6 is a system block diagram of a computer system used to execute one or more software components of system implementing one or more processes described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.x), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method to create reports of retention locked files in a backup system, comprising:

creating, upon deployment of a backup server in the backup system, a hidden directory structure in local storage of a backup server filesystem;

configuring a log rotation policy defining a period of saving retention lock settings for locked files and a report protection duration, wherein each locked file of the locked files is locked through a file retention lock process that locks a file against modification or deletion to prevent unwanted changes to the file;

writing, upon retention locking of the file, details of the file and its retention lock setting to a rotating retention lock audit (RLA) log file associated with a timestamp indicating a time of locking of the file;

storing the RLA log file in the hidden directory structure of the filesystem;

rotating the RLA log file upon writing a next retention locked file for storage in the hidden directory structure, as per the configured log rotation policy;

renaming, upon the rotating and to implement the RLA log file as a rotating log, a previous version of the RLA log file in the hidden directory structure with a timestamp of a most previous locked file by mounting the hidden directory structure locally via a supported filesystem protocol, copying the RLA log file to an object storage of a cloud network maintained by a cloud provider, retention locking the RLA log file in the object storage, and then unmounting the RLA log file;

providing, to a user in response to a request, the RLA log and retention lock settings for the locked files including the previous RLA log files, wherein the previous RLA log files include retention lock settings for previously existing files generated by previous backup jobs to save past retention lock setting information of the backup system; and generating a retention lock report to the user without requiring walking a filesystem and identifying relevant files, by reading the previous RLA log files and the rotating RLA log file from the hidden directory structure for one of: display through a graphical user interface to the user, command line interface to the user, as a REST or equivalent protocol API call response or direction to a report file.

2. The method of claim 1 wherein the hidden directory structure is not visible to the user and cannot be written to by any process other than internally by a filesystem of the backup server.

3. The method of claim 2 wherein the RLA log file is organized as one of a flat file comprising comma separated text data, or a table containing rows of records, and wherein the details of the file in the RLA log file include at least a directory location and file path.

4. The method of claim 3 wherein the details of the lock operation in the RLA log file include: lock timestamp, lock expiry, and lock operation, and wherein the lock operation comprises one of lock enable, lock extension, and lock reversion.

5. The method of claim 1 further comprising:

checking, upon experiencing a system crash, whether or not a file is locked;

triggering, if the file is not locked, a retention lock operation on the file; and adding, after the triggering or if the file is locked as determined by the checking, a lock operation entry indicating that the retention lock operation on the file is complete.

6. The method of claim 2 further comprising locking the RLA log file and previous RLA log files using a filesystem lock of the backup server and for a period of time specified by the configured report protection duration.

7. The method of claim 1 further comprising locking the RLA log file copied to the object storage using a retention locking feature provided by the cloud provider, for a period of time specified by the configured report protection duration.

8. The method of claim 2, wherein the backup system comprises a Data Domain File System deduplication backup system, and wherein the directory structure comprises an MTree.

9. A system for creating reports of retention locked files in a backup system, comprising:

a retention lock component retention locking one or more files to create locked files through a file retention lock process that locks the one or more files against modification or deletion to prevent unwanted changes to the files;

a backup server creating, upon deployment in the backup system, a hidden directory structure in local storage of the backup server, and configuring a log rotation policy defining a period of saving retention lock settings for the locked files and a report protection duration, and writing, details of each locked file and its retention lock setting to a rotating retention lock audit (RLA) log file associated with a timestamp indicating a time of locking of the locked file;

a local storage storing the RLA log file in the hidden directory structure of the filesystem;

a log file component rotating the RLA log file upon writing a next retention locked file for storage in the hidden directory structure, and renaming, upon the rotating and to implement the RLA log file as a rotating log, a previous version of the RLA log file in the hidden directory structure with a timestamp of a most previous locked file by mounting the hidden directory structure locally via a supported filesystem protocol, copying the RLA log file to an object storage of a cloud network maintained by a cloud provider, retention locking the RLA log file in the object storage, and then unmounting the RLA log file; and a reporting module providing, to a user in response to a request, the RLA log and retention lock settings for the locked files including the previous RLA log files, wherein the previous RLA log files include retention lock settings for previously existing files generated by previous backup jobs, the reporting module further generating a retention lock report to the user without requiring walking a filesystem and identifying relevant files, by reading the previous RLA log files and the rotating RLA log file from the hidden directory structure for one of: display through a graphical user interface to the user, command line interface to the user, as a REST or equivalent protocol API call response or direction to a report file.

10. The system of claim 9 wherein the hidden directory structure comprising an MTree that is not visible to the user and cannot be written to by any process other than internally by a filesystem of the backup server, and further wherein the backup system comprises a Data Domain File System deduplication backup system.

11. The system of claim 10 wherein the RLA log file is organized as one of a flat file comprising comma separated text data, or a table, and wherein the details of the file in the RLA log file includes at least a directory location and file path, and further wherein the details of the lock operation in the RLA log file include: lock timestamp, lock expiry, and lock operation, and wherein the lock operation comprises one of lock enable, lock extension, and lock reversion.

12. The system of claim 10 further comprising a backup server filesystem locking component locking the RLA log file and previous RLA log files using a filesystem lock of the backup server and for a period of time specified by the configured report protection duration.

13. The system of claim 10 wherein the RLA log copied to the object storage is retention locked using a retention locking feature provided by the cloud provider, for a period of time specified by the configured report protection duration.

14. The system of claim 10, further comprising a crash recovery component checking, upon experiencing a system crash, whether or not a file is locked; triggering, if the file is not locked, a retention lock operation on the file; and adding, after the triggering or if the file is locked as determined by the checking, a lock operation entry indicating that the retention lock operation on the file is complete.

15. A tangible computer program product, comprising a non-transitory computer-readable medium having stored thereon program code that when executed by a processor, cause the processor to perform a method of creating reports of retention locked files in a backup system, comprising:

creating, upon deployment of a backup server in the backup system, a hidden directory structure in local storage of a backup server filesystem;

configuring, by a hardware-based processing component, a log rotation policy defining a period of saving retention lock settings for locked files and a report protection duration, wherein each locked file of the locked files is locked through a file retention lock process that locks a file against modification or deletion to prevent unwanted changes to the file;

writing, upon retention locking of the file, details of the file and its retention lock setting to a rotating retention lock audit (RLA) log file associated with a timestamp indicating a time of locking of the file;

storing, in a hardware-based storage device, the RLA log file in the hidden directory structure in the filesystem;

rotating the RLA log file upon writing a next retention locked file for storage in the hidden directory structure;

renaming, upon the rotating and to implement the RLA log file as a rotating log, a previous version of the RLA log file in the hidden directory structure with a timestamp of a most previous locked file by mounting the hidden directory structure locally via a supported filesystem protocol, copying the RLA log file to an object storage of a cloud network maintained by a cloud provider, retention locking the RLA log file in the object storage, and then unmounting the RLA log file;

providing, to a user in response to a request, the RLA log and retention lock settings for the locked files including the previous RLA log files, wherein the previous RLA log files include retention lock settings for previously existing files generated by previous backup jobs to save past retention lock setting information of the backup system; and generating a retention lock report to the user without requiring walking a filesystem and identifying relevant files, by reading the previous RLA log files and the rotating RLA log file from the hidden directory structure for one of: display through a graphical user interface to the user, command line interface to the user, as a REST or equivalent protocol API call response or direction to a report file.

16. The product of claim 15 wherein the hidden directory structure is not visible to the user and cannot be written to by any process other than a filesystem of the backup server.

17. The product of claim 16 wherein the RLA log file is organized as one of a flat file comprising comma separated text data, or a database table, and wherein the details of the file in the RLA log file include at least a directory location and file path, and further wherein the details of the lock operation in the RLA log file include: lock timestamp, lock expiry, and lock operation, and wherein the lock operation comprises one of lock enable, lock extension, and lock reversion.

* * * * *